United States Patent
Bromberg et al.

(10) Patent No.: US 10,089,018 B2
(45) Date of Patent: Oct. 2, 2018

(54) MULTI-BANK MEMORY WITH MULTIPLE READ PORTS AND MULTIPLE WRITE PORTS PER CYCLE

(71) Applicant: Marvell Israel (M.I.S.L) Ltd., Yokneam (IL)

(72) Inventors: Dror Bromberg, Michmoret (IL); Roi Sherman, Yokneam (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 63 days.

(21) Appl. No.: 15/130,980

(22) Filed: Apr. 17, 2016

(65) Prior Publication Data
US 2016/0328158 A1    Nov. 10, 2016

Related U.S. Application Data

(60) Provisional application No. 62/158,094, filed on May 7, 2015.

(51) Int. Cl.
G06F 12/00 (2006.01)
G06F 3/06 (2006.01)
G06F 12/06 (2006.01)

(52) U.S. Cl.
CPC ............ G06F 3/0611 (2013.01); G06F 3/067 (2013.01); G06F 3/0619 (2013.01);
(Continued)

(58) Field of Classification Search
CPC .. G06F 3/0611; G06F 3/06719; G06F 3/0656; G06F 3/067; G06F 12/06; G06F 12/0607
See application file for complete search history.

(56) References Cited

U.S. PATENT DOCUMENTS

| 4,870,643 A | 9/1989 | Bultman et al. |
| 5,414,455 A | 5/1995 | Hooper et al. |

(Continued)

FOREIGN PATENT DOCUMENTS

| WO | 2010071655 A1 | 6/2010 |
| WO | 2011075170 A1 | 6/2011 |

OTHER PUBLICATIONS

Bromberg et al., U.S. Appl. No. 15/092,634, filed Apr. 7, 2016.
(Continued)

*Primary Examiner* — Gurtej Bansal

(57) ABSTRACT

A method for data storage includes receiving one or more read commands and one or more write commands, for execution in a same clock cycle in a memory array that comprises multiple single-port memory banks divided into groups. The write commands provide data for storage but do not specify storage locations in which the data is to be stored. One or more of the groups, which are not accessed by the read commands in the same clock cycle, are selected. Available storage locations are chosen for the write commands in the single-port memory banks of the selected one or more groups. During the same clock cycle, the data provided in the write commands is stored in the chosen storage locations, and the data requested by the read commands is retrieved. Execution of the write commands is acknowledged by reporting the chosen storage locations.

13 Claims, 2 Drawing Sheets

(52) U.S. Cl.
CPC .......... *G06F 3/0656* (2013.01); *G06F 3/0659* (2013.01); *G06F 12/06* (2013.01); *G06F 12/0607* (2013.01); G06F 2212/1024 (2013.01); Y02D 10/13 (2018.01)

(56) References Cited

U.S. PATENT DOCUMENTS

| | | | |
|---|---|---|---|
| 5,508,732 | A | 4/1996 | Bottomley et al. |
| 5,581,479 | A | 12/1996 | McLaughlin et al. |
| 5,621,882 | A | 4/1997 | Kakuta |
| 5,636,139 | A | 6/1997 | McLaughlin et al. |
| 6,185,662 | B1 | 2/2001 | Beyerlein et al. |
| 6,311,251 | B1 * | 10/2001 | Merritt .................. G06F 3/0608 711/114 |
| 6,397,324 | B1 | 5/2002 | Barry et al. |
| 7,149,139 | B1 | 12/2006 | Rosen |
| 7,437,472 | B2 | 10/2008 | Rose |
| 7,451,467 | B2 | 11/2008 | Carver et al. |
| 8,358,651 | B1 | 1/2013 | Kadosh et al. |
| 8,514,651 | B2 * | 8/2013 | Levy ....................... G06F 13/16 365/185.09 |
| 2003/0046477 | A1 | 3/2003 | Jeddeloh |
| 2003/0120861 | A1 | 6/2003 | Calle et al. |
| 2009/0164696 | A1 * | 6/2009 | Allen .................. G06F 12/0246 711/1 |
| 2011/0138100 | A1 | 6/2011 | Sinclair |
| 2011/0289256 | A1 | 11/2011 | Bartlett |
| 2013/0205183 | A1 | 8/2013 | Fillingim et al. |
| 2013/0326149 | A1 * | 12/2013 | Barrell ................ G06F 12/0891 711/135 |
| 2014/0177324 | A1 * | 6/2014 | Liu .......................... G11C 8/16 365/154 |
| 2014/0282514 | A1 | 9/2014 | Carson et al. |
| 2016/0162359 | A1 | 6/2016 | Kittner et al. |

OTHER PUBLICATIONS

European Application # 16165893.5 Search Report dated Sep. 21, 2016.
European Application # 16165279.7 Search Report dated Sep. 30, 2016.
International Application # PCT/IB2016/00673 Search Report dated Oct. 5, 2016.
EP Application # 16165893.5 office action dated Sep. 25, 2017.
U.S. Appl. No. 15/092,634 office action dated Feb. 28, 2018.

* cited by examiner

MULTI-BANK MEMORY WITH MULTIPLE READ PORTS AND MULTIPLE WRITE PORTS PER CYCLE

CROSS-REFERENCE TO RELATED APPLICATIONS

This application claims the benefit of U.S. Provisional Patent Application 62/158,094, filed May 7, 2015, whose disclosure is incorporated herein by reference.

FIELD OF THE DISCLOSURE

The present disclosure relates generally to memory devices, and particularly to multi-port memory systems.

BACKGROUND

Various techniques for allowing simultaneous access to a memory are known in the art. For example, U.S. Pat. No. 8,514,651, whose disclosure is incorporated herein by reference, describes a memory device having a set of memory banks to store content data. At least two requests to perform respective read memory operations in a first memory bank are received during a single clock cycle. One or more of the at least two requests are blocked from accessing the first memory bank, and in response: redundancy data associated with the first memory bank and different from content data stored therein is accessed, and, without accessing the first memory bank, at least a portion of the content data stored in the first memory bank is reconstructed based on the associated redundancy data. A first memory read operation is performed using the content data stored in the first memory bank, and a second memory read operation is performed using content data reconstructed i) without accessing the first memory bank and ii) based on the associated redundancy data.

The description above is presented as a general overview of related art in this field and should not be construed as an admission that any of the information it contains constitutes prior art against the present patent application.

SUMMARY

An embodiment that is described herein provides a method for data storage. The method includes receiving one or more read commands and one or more write commands, for execution in a same clock cycle in a memory array that includes multiple single-port memory banks divided into groups. The write commands provide data for storage but do not specify storage locations in which the data is to be stored. One or more of the groups, which are not accessed by the read commands in the same clock cycle, are selected. Available storage locations are chosen for the write commands in the single-port memory banks of the selected one or more groups. During the same clock cycle, the data provided in the write commands is stored in the chosen storage locations, and the data requested by the read commands is retrieved. Execution of the write commands is acknowledged by reporting the chosen storage locations.

In some embodiments, the groups include respective buffers that hold lists of the available storage locations in the memory banks of the groups, and choosing the available storage locations includes looking-up the buffers of the selected groups. In an embodiment, selecting the groups and choosing the storage locations are performed without logical-to-virtual address translation.

In some embodiments, each group further includes a redundancy memory bank that holds redundancy information calculated over data words in the single-port memory banks of the group, and the method includes, in response to detecting that a read command requests data from a single-port memory bank in a group that is also accessed by another read command, reconstructing the data for the read command from the other single-port memory banks of the group and from the redundancy information in the redundancy memory bank of the group.

In an embodiment, the group further includes a cache memory, and storing the data sent in a write command includes calculating updated redundancy information based on the data sent in the write command, caching the updated redundancy information in the cache memory, and storing the updated redundancy information in the redundancy memory bank in a subsequent clock cycle. In a disclosed embodiment, selecting the groups includes choosing the one or more groups having largest quantities of available storage locations.

There is additionally provided, in accordance with an embodiment that is described herein, a memory system including a memory array and control logic. The memory array includes multiple single-port memory banks divided into groups. The control logic is configured to receive one or more read commands and one or more write commands, for execution in the memory array in a same clock cycle, wherein the write commands provide data for storage but do not specify storage locations in which the data is to be stored, to select one or more of the groups that are not accessed by the read commands in the same clock cycle, to choose for the write commands available storage locations in the single-port memory banks of the selected one or more groups, to store the data provided in the write commands in the chosen storage locations and to retrieve the data requested by the read commands during the same clock cycle, and to acknowledge execution of the write commands by reporting the chosen storage locations.

In some embodiments, a network element includes the disclosed memory system.

The present disclosure will be more fully understood from the following detailed description of the embodiments thereof, taken together with the drawings in which:

DETAILED DESCRIPTION OF EMBODIMENTS

Figure 1:
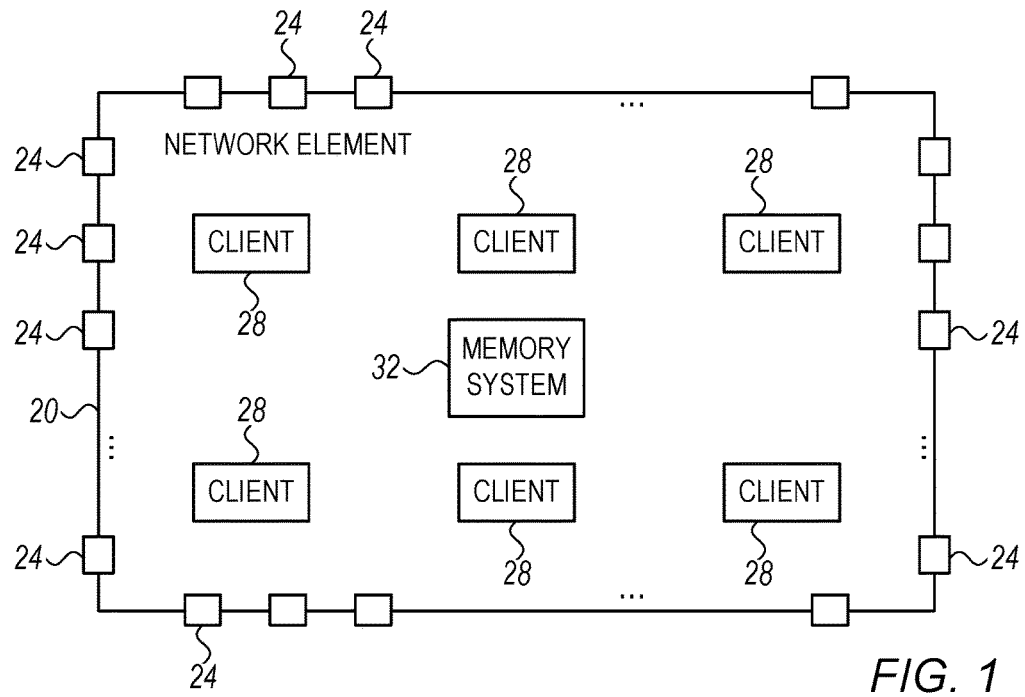
FIG. 1 is a block diagram that schematically illustrates a network element, in accordance with an embodiment that is described herein.

Embodiments that are described herein provide improved memory systems and associated methods. In the disclosed embodiments, a memory system is implemented using a plurality of single-port memory banks. Although each individual memory bank is capable of executing a single command (read or write) in each clock cycle, the memory system as a whole is designed to execute multiple read commands and multiple write commands per clock cycle. For clarity, the embodiments described herein refer to execution of two read commands and two write commands per clock cycle.

In some embodiments, the memory banks are divided into groups. Each group comprises N memory banks (also referred to as functional memory banks), and a redundancy memory bank (also referred to as XOR bank). Each functional memory bank stores a large number of data words. The redundancy memory bank stores redundancy words that are each calculated over N respective data words from the N functional memory banks.

The memory system comprises control logic that receives read and write commands from one or more clients and executes the commands in the functional memory banks. Unlike conventional storage schemes, each write command provides a data word for storage, but does not specify a storage location or address in the memory system at which the data word is to be stored.

Instead, when handling a write command, the control unit chooses an appropriate storage location in one of the functional memory banks, stores the data word in the chosen storage location, and reports an identifier of the storage location to the client. The identifier, referred to as a Physical Identifier (PID), is used by the client in subsequent read commands for retrieving the data word. Each group of functional memory banks typically comprises a Free-Entries FIFO (FIFO) buffer that holds a list of the free PIDs in the group.

In some embodiments, inasmuch as the memory system is made up of single-port memory banks, the control unit executes two read commands and two write commands in the same clock cycle as follows:

If the two read commands specify PIDs that belong to different functional memory banks, each read command is executed by reading a data word from the specified functional memory bank, i.e., in accordance with the PID specified in the command.

If, on the other hand, two read commands specify PIDs that belong to the same functional memory bank, one read command is executed in the specified functional memory bank. The data word requested by the second read command is not read from the specified functional memory bank, but rather reconstructed using the other functional memory banks and the redundancy bank of the row. In either case, both read commands are executed in the same clock cycle, even when they both access the same single-port memory bank.

The two storage locations for the two write commands are chosen in two different groups that are not accessed by the read commands. For executing two read commands and two write commands in the same clock cycle, a minimum of four groups is sufficient. The control unit typically chooses the storage locations by looking-up the lists of available PIDs in the FEFs of the selected groups.

Following each write command, the redundancy word affected by the command is updated, and cached in a small cache memory of the group. The cached redundancy word is copied to the redundancy bank of the group in the next clock cycle having a write to the same group. Caching of this sort is needed because the redundancy bank is already written-to in the present clock cycle, for updating a previously-calculated redundancy word from the cache memory.

The disclosed memory systems enable execution of multiple commands per clock cycle, even though the underlying memory devices comprise single-port memories. As such, the disclosed techniques provide fast and parallel storage, while at the same time retaining a low clock rate, low cost, small size and low power consumption.

Moreover, the disclosed techniques do not involve any sort of logical-to-physical address translation. The memory system and clients use only a single address space formed by the range of PID values, rather than different logical and physical address spaces. As such, the complexity of managing logical-to-physical address translation, and the die area needed for storing logical-to-physical mapping tables, are obviated.

FIG. 1 is a block diagram that schematically illustrates a network element 20, in accordance with an embodiment that is described herein. In the present example, network element 20 comprises a network switch that forwards communication packets in a communication network. In alternative embodiments, network element 20 comprises any other suitable type of network element, such as a router or a bridge.

In the embodiment of FIG. 1, network element 20 comprises multiple ports 24 for receiving and transmitting packets, and suitable circuitry for processing the packets, e.g., for buffering packets and for forwarding packets from one port to another. In the present example, the circuitry comprises one or more clients 28, and a memory system 32 that stores data for clients 28. Clients 28 typically comprise various processing units or processing cores of network element 20, for example a CPU or a plurality of ASIC processing engines that are configured to perform packet processing operations to process packets received and transmitted via ports 24, but may generally comprise any suitable module that stores and retrieves data.

Figure 2:
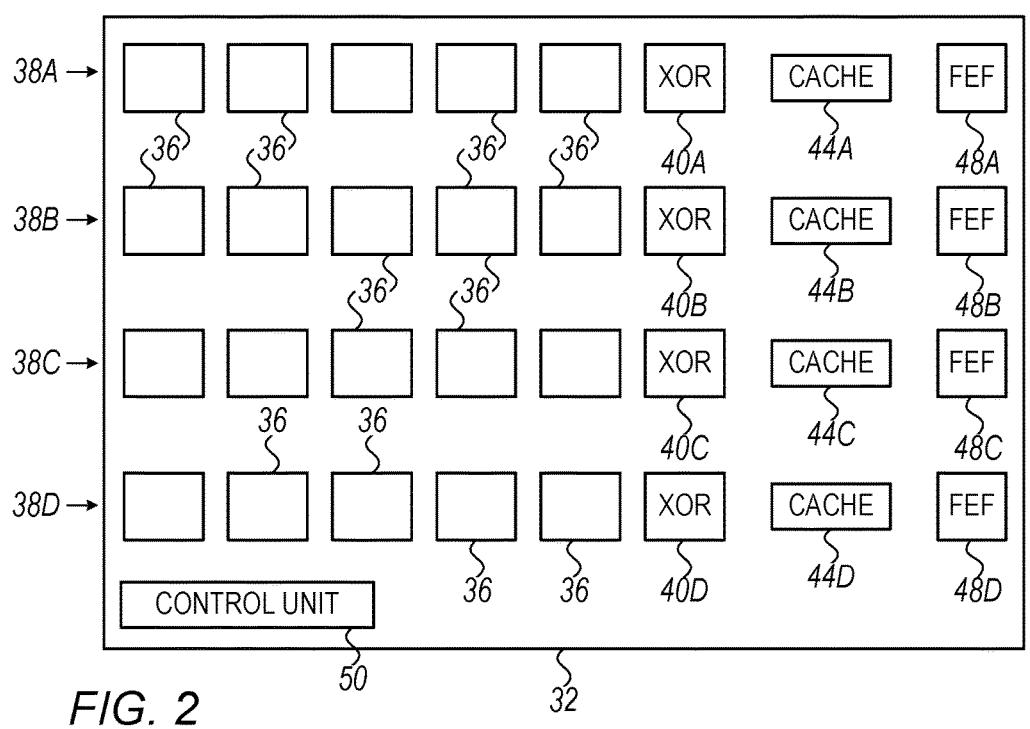
FIG. 2 is a block diagram that schematically illustrates a memory system suitable for use in the network element of FIG. 1, in accordance with an embodiment that is described herein.

FIG. 2 is a block diagram that schematically illustrates the internal structure of memory system 32, in accordance with an embodiment that is described herein. In some embodiments, memory system comprises a plurality of memory units 36 that are referred to herein as memory banks or functional memory banks. Each functional memory bank 36 comprises multiple physical storage locations, e.g., on the order of thousands. Each storage location is configured to store a respective data word. The term "data word" refers to any suitable data item of any suitable size.

Typically, in an embodiment, each memory bank 36 comprises a single-port memory, meaning it is capable of executing a single command, e.g., one read command or one write command, per clock cycle. The clock cycles in question are those of the clock signal that clocks memory banks 36. In the present context, clock cycles are also referred to herein as memory-access cycles, and the two terms are used interchangeably. In the present example, each memory bank 36 comprises a single-port Static Random Access Memory (SRAM). Alternatively, however, memory banks 36 are implemented using any other suitable type of memory, e.g., Dynamic Random Access Memory (DRAM).

Although each memory bank 36 is capable of executing no more than a single read command or a single write command per clock cycle, memory system 32 as a whole is designed, in an embodiment, to execute two read commands and two write commands per clock cycle. Alternative configurations that are designed to execute a larger number of read and/or write commands per clock cycle are addressed further below.

In some embodiments, memory banks 36 are divided into multiple groups. For clarity, the groups are also referred to herein as rows, and each group is illustrated as a separate row in FIG. 2. The use of the term "row," however, does not connote any specific spatial orientation of memory banks 36.

In the example of FIG. 2, memory banks 36 are arranged in four rows denoted 38A, 38B, 38C and 38D.

In an embodiment, memory system 32 further comprises redundancy memory banks 40A-40D, associated with rows 38A-38D, respectively. Redundancy memory banks 40A-40D are also referred to as XOR banks. XOR banks 40A-40D typically comprise single-port memories, e.g., single-port SRAMs, similar to functional memory banks 36. The XOR bank of a given row stores redundancy information (e.g., parity information) that is calculated over the data stored in the functional memory banks 36 of the row.

In an example embodiment, each row has N functional memory banks 36. The XOR bank of each row stores XOR words, each XOR word being equal to a bit-wise XOR of a set of N data words stored in the respective N functional memory banks of the row. Each set of N data words and the corresponding XOR word are referred to as a stripe. A given data word, which is stored in a given functional memory bank 36, can be reconstructed from the other N-1 data words in the stripe (stored on the other N-1 functional memory banks) and the XOR word of the stripe.

In an embodiment, memory system 32 further comprises cache memories 44A-44D, and First-In First-Out (FIFO) memories 48A-48D, associated with rows 38-38D, respectively. Each FIFO holds a list of the free PIDs in functional memory banks 36 of the row. FIFOs 48A-48D are thus also referred to as a Free-Entries FIFOs (FEFs). Each of cache memories 44A-44D typically has a size of a single data word. FEFs 48A-48D are typically implemented using single-port memory, e.g., single-port SRAM. The roles of cache memories 44A-44D and FEFs 48A-48D is explained in detail below. Memory system 32 also comprises a control unit 50, also referred to herein as control logic, which manages the storage of data in memory banks 36 and communicates with clients 28.

The configurations of network element 20 and memory system 32 shown in FIGS. 1 and 2 are example configurations, which are depicted solely for the sake of clarity. In alternative embodiments, any other suitable network element and/or memory system configuration can also be used. For example, memory banks 36 may be divided into any other suitable number of groups, each group comprising any other suitable number of memory banks. In one embodiments, the groups of functional memory banks are columns rather than rows.

Furthermore, although the embodiment of FIG. 2 refers to execution of two read commands and two write commands per clock cycle, in alternative embodiments memory system 32 may be designed using the disclosed techniques, mutatis mutandis, for execution of any other suitable number of read commands, and any other suitable number of write commands, per clock cycle. Further aspects of parallel execution of memory commands are addressed, for example, in U.S. patent application Ser. No. 14/964,219, filed Dec. 9, 2015, which is assigned to the assignee of the present patent application and whose disclosure is incorporated herein by reference.

The different elements of network element 20 and memory system 32 typically are implemented using dedicated hardware, such as using one or more Application-Specific Integrated Circuits (ASICs), Field-Programmable Gate Arrays (FPGAs) and/or RF Integrated Circuits (RFICs). Alternatively, some elements of network element 20 and/or memory system 32, e.g., control unit 50 (also referred to as control logic) or parts thereof, may be implemented using software executing on programmable hardware, or using a combination of hardware and software elements. Elements of network element 20 and memory system 32 that are not mandatory for understanding of the disclosed techniques have been omitted from the figure for the sake of clarity.

Although the embodiments described herein refer mainly to data storage in the context of a network element, the disclosed techniques are not limited to such applications. The methods and systems described herein are applicable in a wide variety of alternative applications that involve storage of data.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In some embodiments, control unit 50 of memory system 32 receives from clients 28, in each clock cycle, up to two read commands and up to two write commands for execution. Each write command provides memory system 32 with a data word, for storage. Each read command requests readout of a data word.

In contrast to conventional storage schemes, in the disclosed embodiments, clients 28 do not specify the addresses in which the data is to be stored. Instead, the storage location for each data word in memory banks 36 is selected by control unit 50.

Typically, a write command from a client 28 specifies only the data word to be stored without an address. As part of processing the write command, unit 50 selects an available physical storage location in one of memory banks 36 for storing the data word. The selected physical storage location is identified by a respective Physical Identifier (PID). If no PID is available for executing the write command, unit 50 typically returns back-pressure to the client that issued the command.

Typically, Free-Entries FIFOs (FEF) 48A-48D hold respective lists of the PIDs in the memory banks 36 of the corresponding rows 38A-38D that are currently available for storage. Control unit 50 notifies client 28 of the PID in which the data word has been stored, e.g., in an acknowledgement message that acknowledges successful completion of the write command. When this data word is later to be retrieved, client 28 issues to memory system 32 a read command that specifies this PID.

The PID-based addressing mechanism described above is suitable, for example, for storing and retrieving data words that are arranged in Dynamic Linked Lists (DLLs), but is applicable generally to any other type of data. Note that this addressing mechanism typically does not involve any sort of translation from virtual or logical addresses into physical addresses. Memory system 32 and clients 28 use only the single address space defined by the range of PID values.

In an embodiment, in order to be able to execute two read commands and two write commands in every clock cycle, control unit 50 employs the following mechanisms (explained in further detail below):

A first read command is executed in accordance with the PID specified in the command. If a second read command accesses the same memory bank as the first read command, the data for the second read command is reconstructed using the other memory banks 36 of the row and XOR bank 40.

The storage locations for the write commands are chosen in rows that are not accessed by the read commands.

Following a write command, the appropriate XOR word is updated and cached, and stored in the XOR bank 40 on a subsequent clock cycle having a write command to the same row.

Figure 3:
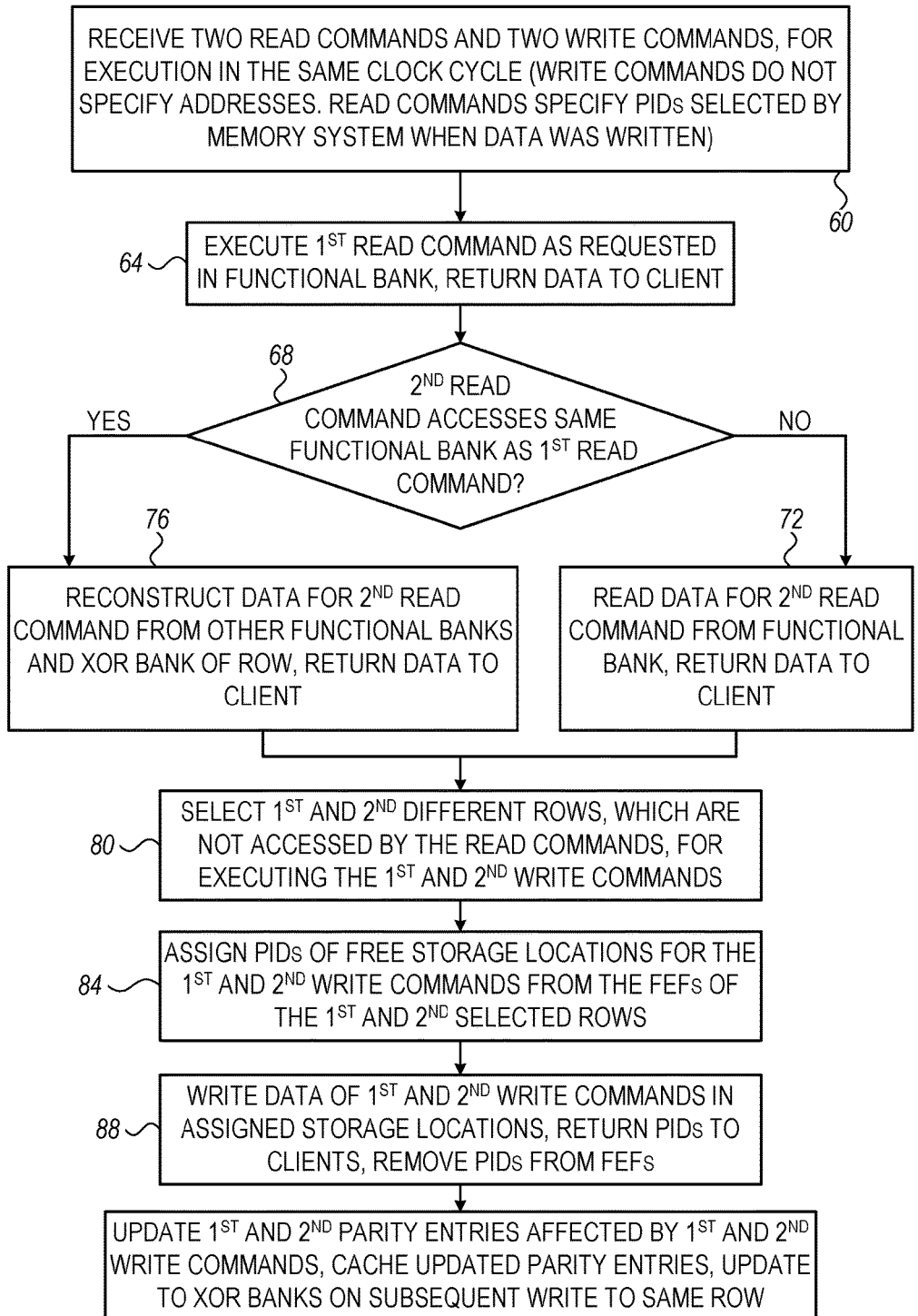
FIG. 3 is a flow chart that schematically illustrates a method for executing two read commands and two write commands in the same clock cycle, in accordance with an embodiment that is described herein.

FIG. 3 is a flow chart that schematically illustrates a method for executing two read commands and two write commands in memory system 32 in the same clock cycle, in accordance with an embodiment that is described herein. The method begins with control unit 50 receiving first and second read commands, and first and second write commands, at a command input operation 60. The four commands (two read commands and two write commands) are all to be executed in the same clock cycle.

At a first read execution operation 64, control unit 50 executes the first read command in the specified memory bank 36. Control unit 50 typically extracts the PID from the first read command, reads a data word from the storage location identified by this PID, and provides the data word to the requesting client 28.

At a collision checking operation 68, control unit 50 checks whether the second read command accesses the same memory bank 36 as the first read command. If the second read command accesses a different memory bank, control unit 50 executes the second read command in that memory bank, in accordance with the PID specified in the second read command, at a normal read execution operation 72. Control unit 50 typically extracts the PID from the second read command, reads a data word from the storage location identified by this PID, and provides the data word to the requesting client 28.

If, on the other hand, operation 68 identifies that the second read command accesses the same memory bank as the first memory bank, control unit 50 cannot access that memory bank in the same clock cycle. Instead, control unit 50 reconstructs the data word requested by the second read command, at a reconstruction operation 76. Control unit reconstructs the data word requested by the second read command by calculating a bit-wise XOR of the remaining data words of the same stripe (stored on the other memory banks 36 of the same row), and the XOR word of the stripe (stored in the XOR bank of this row). Control unit 50 provides the reconstructed data word to the requesting client 28.

At a row selection operation 80, control unit selects first and second different rows in which to execute the first and second write commands, respectively. Since memory system 32 comprises four rows 38A . . . 38D, even if the first and second read commands access two different rows, two rows remain available for executing the write commands.

In some embodiments, control unit 50 selects the row or rows for executing the write commands, from among the rows that are not accessed by read commands, using some predefined selection criterion. Selection is performed, for example, if the two read commands access the same row, if only one write command is received, or in an alternative implementation having more than four rows in total. In an example embodiment, control unit 50 selects the row or rows having the largest number of available free storage locations (i.e., having the largest number of free PIDs in FEFs 48A-48D).

At a PID assignment operation 84, control unit assigns a storage location for the first write command in one of memory banks 36 of one of the selected rows, and a storage location for the second write command in one of memory banks 36 of the other selected row. The control unit selects the storage locations by looking-up the available PIDs listed in the FEFs of the selected rows.

At a write execution operation 88, control unit 50 writes the data words of the first and second write commands in the selected storage locations. Control unit 50 notifies the requesting clients 28 of the PIDs selected for the write commands, for use in subsequent retrieval of the data words, and removes these PIDs from the FEFs.

At a XOR updating operation 92, control unit 50 updates the XOR words of stripes to which the two write commands were written. In an embodiment, control unit 50 calculates an updated XOR word by performing bit-wise XOR between the new word and the existing data words of the stripe (without the data in the bank that was accessed by the write command). In the present clock cycle, control unit 50 does not store the updated XOR word to XOR bank 40, because the XOR bank is already written-to in this clock cycle for updating a cached XOR word that was calculated in a previous clock cycle. Instead, control unit 50 caches the updated XOR word in the cache memory of the row, and copies the updated XOR word to the XOR bank in a subsequent clock cycle that comprises a write command to the row.

Thus, in some embodiments control unit 50 executes each write command (operations 88 and 92) in a three-stage pipelined process:

Stage 1: Write the data provided in the write command to the chosen storage location in the selected functional memory bank 36. In the same clock cycle, read the other data words in the same stripe (from the other functional memory banks 36 of the same row). In addition, in the same clock cycle, write the data from the cache (if the data in the cache is valid) to the XOR bank (the XOR word from the previous write command).

Stage 2 (in the next clock cycle): Calculate the updated XOR word by performing bitwise XOR betweeen the new word written to the stripe and the existing data words of the stripe (without the data in the bank that was accessed by the write command). Write the updated XOR word to the cache memory of the row.

Stage 3 (in some later clock cycle having a new write command to the same row): write the updated XOR word from the cache memory to the XOR bank.

The method of FIG. 3 is an example method that is depicted solely for the sake of clarity. In alternative embodiments, control unit 50 may carry out the disclosed techniques using any other suitable method. For example, the flow of FIG. 3 refers to the worst-case scenario in which two read commands and two write commands are to be executed in the same clock cycle. If fewer commands are received in a given clock cycle, some of the operations of FIG. 3 are omitted or simplified. For example, if only one read command is received, operations 68-76 are omitted. If only one write command is received, operations 80-92 are simplified and involve only a single row.

Although the embodiments described herein mainly address a memory system having four rows of memory banks, for executing two read commands and two write commands per clock cycle. The disclosed techniques, however, can be used for executing a larger number of read commands and/or a larger number of write commands per clock cycle. For example, increasing the number of XOR banks per row, or using a more complex redundancy scheme, enables executing a larger number of read commands per clock cycle, even if multiple read commands attempt to access the same functional memory bank. Increasing the number of rows enables executing a larger number of write commands per clock cycle. Another way to increase the number of read and/or write commands per cycle is to use functional memory banks having more than a single port. For example, implementing the disclosed technique using dual-port functional memory banks enables execution of four read commands and four write commands per clock cycle.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   receiving, from a client, one or more read commands and one or more write commands, for execution in a same clock cycle in a memory array that comprises multiple single-port memory banks divided into groups, wherein the write commands provide data for storage but the client does not specify a storage location or address in the memory array at which the data is to be stored;
   selecting one or more of the groups that are not accessed by the read commands in the same clock cycle, and choosing for the write commands available storage locations in the single-port memory banks of the selected one or more groups;
   during the same clock cycle, storing the data provided in the write commands in the chosen storage locations, and retrieving the data requested by the read commands; and
   acknowledging execution of the write commands by reporting the chosen storage locations to the client.

2. The method according to claim 1, wherein the groups comprise respective buffers that hold lists of the available storage locations in the memory banks of the groups, and wherein choosing the available storage locations comprises looking-up the buffers of the selected groups.

3. The method according to claim 1, wherein selecting the groups and choosing the storage locations are performed without logical-to-virtual address translation.

4. The method according to claim 1, wherein selecting the groups comprises choosing the one or more groups having largest quantities of available storage locations.

5. The method according to claim 1, wherein each group further comprises a redundancy memory bank that holds redundancy information calculated over data words in the single-port memory banks of the group, and comprising, in response to detecting that a read command requests data from a single-port memory bank in a group that is also accessed by another read command, reconstructing the data for the read command from the other single-port memory banks of the group and from the redundancy information in the redundancy memory bank of the group.

6. The method according to claim 5, wherein the group further comprises a cache memory, and wherein storing the data sent in a write command comprises calculating updated redundancy information based on the data sent in the write command, caching the updated redundancy information in the cache memory, and storing the updated redundancy information in the redundancy memory bank in a subsequent clock cycle.

7. A memory system, comprising:
   a memory array, comprising multiple single-port memory banks divided into groups; and
   control logic, configured to receive from a client one or more read commands and one or more write commands, for execution in the memory array in a same clock cycle, wherein the write commands provide data for storage but the client does not specify a storage location or address in the memory array at which the data is to be stored, to select one or more of the groups that are not accessed by the read commands in the same clock cycle, to choose for the write commands available storage locations in the single-port memory banks of the selected one or more groups, to store the data provided in the write commands in the chosen storage locations and to retrieve the data requested by the read commands during the same clock cycle, and to acknowledge execution of the write commands by reporting the chosen storage locations to the client.

8. The memory system according to claim 7, wherein the groups comprise respective buffers that hold lists of the available storage locations in the memory banks of the groups, and wherein the control logic is configured to choose the available storage locations by looking-up the buffers of the selected groups.

9. The memory system according to claim 7, wherein the control logic is configured to select the groups and choose the storage locations without performing logical-to-virtual address translation.

10. The memory system according to claim 7, wherein the control logic is configured to select for the write commands the one or more groups having largest quantities of available storage locations.

11. The memory system according to claim 7, wherein each group further comprises a redundancy memory bank that holds redundancy information calculated over data words in the single-port memory banks of the group, and wherein, in response to detecting that a read command requests data from a single-port memory bank in a group that is also accessed by another read command, the control logic is configured to reconstruct the data for the read command from the other single-port memory banks of the group and from the redundancy information in the redundancy memory bank of the group.

12. The memory system according to claim 11, wherein the group further comprises a cache memory, and wherein the control logic is configured to calculate updated redundancy information based on the data sent in the write command, to cache the updated redundancy information in the cache memory, and to store the updated redundancy information in the redundancy memory bank in a subsequent clock cycle.

13. A network element comprising the memory system of claim 7.

* * * * *